Oct. 27, 1959  R. E. WILLIAMS  2,910,299
TONE WHEEL MANUFACTURING MACHINE
Filed April 21, 1950  5 Sheets-Sheet 1

INVENTOR
Richard E. Williams

Oct. 27, 1959

R. E. WILLIAMS 2,910,299

TONE WHEEL MANUFACTURING MACHINE

Filed April 21, 1950

INVENTOR
Richard E. Williams

INVENTOR
Richard E. Williams

Patented Oct. 27, 1959

2,910,299

TONE WHEEL MANUFACTURING MACHINE

Richard E. Williams, Manchester, N.Y., assignor to Wilbespan Research Labs., Inc., Manchester, N.H.

Application April 21, 1950, Serial No. 157,390

8 Claims. (Cl. 274—5)

This invention relates to a tone wheel manufacturing machine, and more particularly to a tone wheel manufacturing machine in which soundtracks are recorded in endless form, on a suitable medium.

It has heretofore been proposed to obtain satisfactory endless soundtrack recording with an acceptable start-end spot by means of successive phase shifts taking place during the recording process in such manner that the waveform reaches the starting spot in phase coincidence. Another method of creating endless soundtracks of this type has been to record specific frequencies in such manner that they inherently cycle and return in phase coincidence. In the case of a single endless soundtrack on a tone wheel this is accomplished by mathematically computing the proper tone wheel speed in relation to the recorded frequency.

Where it is desired to record all tones of an equally or suitably tempered scale upon a single tone wheel the former method described results in undesirable pitch variations, whereas, the latter does not meet the plurality stipulation.

An object of the present invention is to provide a tone wheel manufacturing machine of the electronic-mechanical type wherein all tones of any scale, regardless of composite frequencies, may be recorded in endless soundtrack form on a single tone wheel without introducing distracting pitch or amplitude variations.

Another object of the invention is to provide a means for causing intentional or inherent discrepancies in endless soundtracks recorded upon a tone wheel to recur at a natural vibrato rate.

Again, the invention has for its object a means for staggering in random manner the start-end spots on endless soundtracks resulting in minimized cumulative discrepancy manifestation.

A further aim of the invention is a controllable means for overlapping and tapering the recorded waveforms of an endless soundtrack at the start-end point.

The foregoing and other objects will manifest themselves as the following description progresses, reference being had to the accompanying drawings wherein.

Wherever a member having mass is caused to cycle at a periodic rate it is extremely difficult, if not impossible, to prevent unwanted variations in speed of that member recurrent at that cycling rate. These variations may be the result of mechanical eccentricities, umbalances, non-uniform frictional loads, etc. In the case of a tone wheel where generated pitches are directly related to the cycling speed of the tone wheel such variations can easily cause audible manifestations which may be highly distracting in some cases. In order to appreciate the seriousness of this problem it can be stated that the human ear can in some cases discern deviation in pitch, and therefore speed, in the order of .05%. The reduction of unwanted variations to values less than this figure almost invariably results in a costly mechanical device, if not a device which is completely impractical from a production standpoint.

As is well known by those skilled in the arts, a variation in pitch of a tone intended for ultimate use as a musical note is psychologically acceptable and even desirable if it is recurrent at a rate of between 4–12 times a second. This is known as the natural vibrato range.

If all the endless soundtracks which are to be scanned as sources of musical notes are caused to cycle in such a manner that pitch or amplitude discrepancies recur at this rate their manifestations are found to be enhancing rather than distracting. In the generation of an endless soundtrack, great difficulty is observed when attempts are made to join the start and end of a soundtrack during a recording process. The methods hitherto proposed to overcome the difficulty at this start-end spot roughly drop into two categories. In the first, prior empirical determination of the number of cycles appearing in an endless soundtrack is utilized as a basis for introducing periodical phase shifts in the recorded wave train in such manner that in-phase joining of the start-end spot results. This method is extremely laborious, difficult, and of questionable uniformity. In addition, phase shifts so introduced are effectively equivalent to periodic pitch changes, so they result in intolerable loss in pitch accuracy. Another method is to put a single endless soundtrack or a plurality of soundtracks mathematically related to one another on a single tone wheel which cycles at a basic rate that is a common factor of all the frequencies recorded thereon. This method, while satisfying start-end coincidence conditions, greatly limits the number of pitches that can be produced from a single tone wheel.

*Rise-fall control*

Figure 4:
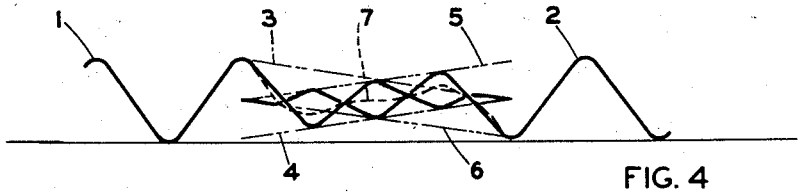
Fig. 4 is a view of a start-end spot in which waveforms overlap 180° out of phase.

In the method peculiar to my invention exact relative pitches can be recorded in endless soundtrack form on a tone wheel with an independent basic cycling speed, and a tapering merger of the start and end of the soundtracks is utilized to minimize any distracting clicks that may result from improper phasing of the waveforms at the start-end point. A diagrammatic view of this condition is shown in Fig. 4. An end of the soundtrack 1 merges with its beginning 2 in phase opposition. However, the waveform 1 is tapered as shown by lines 3 and 4 and the waveform 2 gradually increased as shown by lines 5 and 6 in such a manner that no abrupt waveform reversal takes place. As shown by line 7 the cumulative summation of the waveforms is an overall wave shape reaching a minimum point somewhere between the two full modulation values. If the waveforms return in phase, the condition shown in Fig. 5 occurs. Here the waveform 8 merges with the waveform 9 in such a manner that their cumulative summation results in the waveform shown as the dotted line 10. It will be noted that in this case no change of any type is effected at the start-end spot as far as scanning is concerned.

Figure 5:
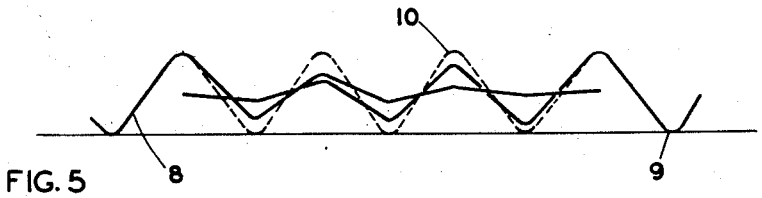
Fig. 5 is a view of a start-end spot in which waveforms overlap in phase coincidence.
Figure 8:
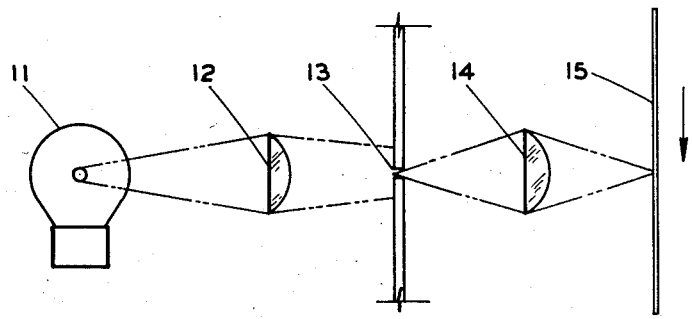
Fig. 8 is a typical optical mechanical train used to record a photoelectric soundtrack.

The tapering condition seen in Figs. 4 and 5 is a result of controlling the modulation of the waveform recorded. In the case of photoelectric waveform recording this can result from a variation in the recording light intensity or in light variation percentage. Referring to Fig. 8, a typical light modulating device used for recording purposes is seen to have a light source 11 focused by a suitable condensing lens 12 upon a varying aperture 13. The light penetrating the aperture 13 is focussed by a suitable objective lens 14 upon a light sensitive emulsion 15. If the aperture 13 is caused to vary in width electronically in accordance with a desired signal it is seen that the amount of light which reaches the light sensitive emulsion 15 will vary similarly. As is well known to those skilled in the art, the light modulating device may occur in many other forms such as vibrating mirrors, gaseous discharge devices, etc. Because the invention herein described is essentially applicable to any of these light modulators, only one, that of Fig. 8, is shown for the sake of simplicity.

A relatively simple method of obtaining the tapered condition at the start-end point is simply to use an incandescent bulb as a source of light 11, and pulse it with voltage in such manner that the inherent time lag in the incandescence of such a bulb will result in a relatively slow rise of light to its full value and an essentially similar decline when the exciting voltage is removed.

Figure 7:
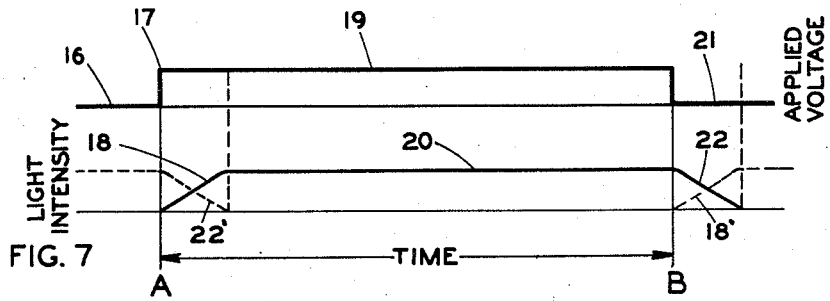
Fig. 7 is a graph on a time base showing a timing pulse and rise-fall shaped tapers.

With reference to Fig. 7, the upper graph 16 may be considered that of a voltage applied to the lamp. At the point A the voltage is abruptly turned on reaching a value indicated by the height 17. The filament of the bulb cannot heat to incandescence immediately, however, but slowly rises to a finite value in the manner indicated by the lower curve 18. The applied voltage 19 and the maximum light intensity 20 are sustained for a given amount of time, usually that of one tone wheel cycle or an exact sub-multiple thereof, as will be later described. At the end of this time, point B, the voltage 19 is abruptly removed dropping again to a zero value 21. Again the incandescence of the light filament cannot respond as rapidly, so it declines slowly in the manner shown by the curve 22. Although a linear time basis is shown, it must be remembered that the soundtrack itself is cycling so that points B and A, when a single cycle is assumed, are actually one and the same point physically speaking. Consideration of this fact will bring realization that the slow rise in incandescence 18 is also occurring as 18' overlapping the incandescent decline 22. Similarly the incandescent decline 22 overlaps the incandescent rise 18 as shown by dotted line 22' at point A.

The rapidity of the rise 18 and the decline 22 is a function of the time lag inherent in the filament of the lamp. This can be controlled by several factors such as gas pressure within the bulb, but is dependent to the greatest extent upon the physical thickness and metallic composition of the filament itself. Generally speaking, the thicker the filament the slower will be the rate of rise and decline. My experimentations have shown that it is possible to operate a bulb with proper time lags. Because the light intensity, a value dictated by the sensitivity of the film etc., is dependent upon the wattage consumption of the bulb, it will be normally necessary to use a thin filament bulb at a high voltage for a rapid rise and fall time or a thick filament bulb at a low voltage where a slow rise and decline is desired. Proper bulb and power supply design can satisfactorily meet requirements over a considerable range.

A great advantage to pulsing a light in this manner is realized in attainment of a very high light intensity while not exceeding nominal light-operating limitations. For instance, a light with a normal light-operating voltage of 110 v. continuous rating can be pulsed with voltages as high as 250 v. provided these voltages are not maintained for a long period of time. Incandescent light intensity varies roughly as the square of the applied voltage, so very high intensities can be obtained in this manner. With the exposures required, in normal tone wheel manufacturing processes, utilization of this condition aids tremendously in achieving high photographic contrast. In addition, it is possible to use incandescent bulbs with highly concentrated filaments and, therefore, optically efficient design.

The shape of the rise-fall curves will be modified somewhat by the conditions under which exposure and development take place. In photographic terminology, the effective film "gamma" will set the contrast to exposure ratio.

Figure 17:
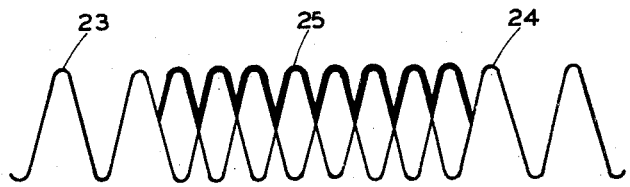
Fig. 17 is an overlapped spot with extended time conditions.

It is possible, and in many cases desirable, to purposely overtime the exposure cycle A—B in Fig. 7. In this case cumulative waveform exposure results in distortion primarily of second harmonic form. Such harmonic components, or "partials," merely change the tone quality of the tone track recorded in a small degree but do not give rise to dissonances because of their perfect octave relationship to the fundamental frequency of the waveform recorded. Over-timing of this type tends actually to minimize the manifestations audible upon scan of an overlap spot. A graph of the condition is shown in Fig. 17. It will be noted that in this overlap spot the waveforms 23 and 24, which are shown in 180° phase relationship, give rise to an additive equivalent 25, having a fundamental frequency twice that of the basic waveforms 23 and 24. Because the ear of the average human being tends to make the loudness of sound pitches appear roughly proportional to their frequencies (for frequencies below 3,000 c.p.s.), the additive waveform equivalent 25, although less in amplitude than that of the fundamental frequencies 23 and 24, will be to the ear approximately equal in loudness. This results in a masking effect of the start-end spot in the soundtrack.

Alternate methods of obtaining the rise-fall conditions shown in Fig. 7, are many in form. Illustrative of typical substitutions for the technique of utilizing the incandescent rise and fall time of a bulb are those shown in Figs. 8, 9, and 10. In Fig. 8, if the aperture 13 is caused to slowly open to its operating value, the average light intensity will correspondingly increase giving a fade-in effect similar to that of the incandescent filament rise.

Figure 9:
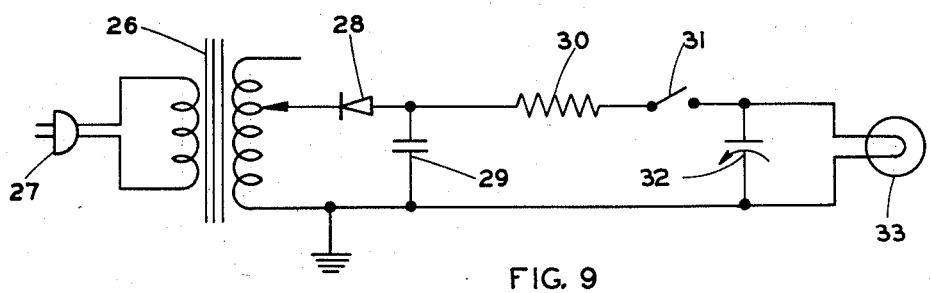
Fig. 9 is a typical electrical equivalent of the device shown in Fig. 6.

If the arrangement in Fig. 9 is used, the rapid rise time resulting from use of a bulb with a very fine filament, gaseous discharge construction, or some other well-known forms, can be retarded. Referring to Fig. 9, a variable voltage transformer 26 is suitably connected to an alternating frequency supply source by means of a plug 27. The controllable voltage output is rectified by means of a rectifier 28 and filtered by means of a condenser 29. This rectified or D.C. voltage is impressed across a circuit consisting of a resistance 30, a switch 31, a variable capacity 32, and the aforementioned bulb 33. The switch 31 suitably operated by a timing device, later to be described, is closed when an exposure cycle is to commence. At the first instant of closure the capacitor 32 acts as a short circuit and draws a strong charging current through the resistance 30. The corresponding voltage drop across the resistance 30 leaves very little voltage for the bulb 33. As the capacitor 32 slowly charges, however, its charging current and, therefore, the voltage drop across the resistance 30 decreases, slowly increasing the voltage across the bulb 33. This series of events provides a slow increase of intensity in the bulb 33. When the capacitor 32 is fully charged it ceases to draw current and the bulb 33 is at full intensity. The time required for this condition to occur is determined by the value of capacity 32.

At the end of the timing cycle switch 31 is opened. The capacitor 32, which is fully charged, will commence to discharge through the bulb 33. The time required for complete discharge to take place is determined by the size of the capacitor 32 and internal resistance of the bulb 33. For similar rise and fall times the internal resistance of the bulb 33 should be of essentially the same ohmic value as the resistance 30. Once similar rise and fall times have been obtained through proper relative choice of these two values changing the value of the capacitor 32 will extend or shorten the rise and fall times simultaneously. This control, in effect, is that of varying the slope of the tapered curves 18 and 22 in Fig. 7.

In the recording process the capacitor 32 in Fig. 9, is increased until the click resulting from the scan of a start-end spot is minimized to the desired amount. If the capacitor 32 is made too large the taper is too long in optimum relation to the track, and a manifestation will be a softer sound output.

The variable transformer 26 in Fig. 9, provides a means of varying the maximum intensity of the bulb 33. In the case of photographically recording a tone wheel in the form of a disc with concentric endless soundtracks such as those shown in Figs. 1 and 2, it is desirable to increase the intensity in steps as recording progresses from the inner tracks to the outer to compensate for the change in relative surface velocity between those points.

Figure 10:
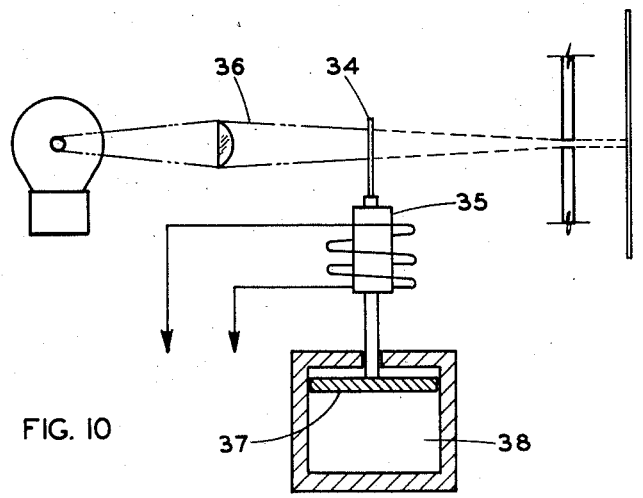
Fig. 10 shows a shutter-operated light intensity control.

Still another method for slowly increasing and decreasing the effective exposure and intensity is that shown in Fig. 10. Here a shutter 34 affixed to the core of solenoid 35 is positioned so as to intercept the light rays 36. Also affixed to the shutter 34 is a piston 37 of a dashpot assembly 38. Here the time resistant characteristic of the dashpot 38 is utilized to cause a corresponding time lag in the light intensity increase and decrease. In this case a triggering switch such as 31 in Fig. 9, is used to energize and de-energize the solenoid 35. The rise and fall time can be controlled by proper design of the dashpot 38, as is known to those skilled in the art.

Figure 11:
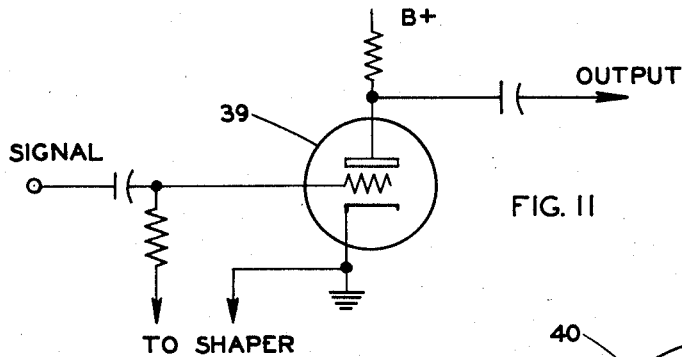
Fig. 11 is a typical electronic gating circuit.

Because, as has been mentioned, it is merely necessary to control the modulation percentage of the soundtrack to obtain the tapered conditions shown in Figs. 4, 5, 7, and 17, the modulating audio voltages may be controlled to obtain the same effect as that of changing the light intensity. Typical of many circuits able to perform this function is that shown in Fig. 11. Here a variable-mu tube 39 has simultaneously applied to its grid, the above-mentioned audio signal and a biasing voltage waveform similar to that obtained across the capacitor 32 of Fig. 9. By nature of this type tube it will pass the audio signal from grid to plate only if the average voltage on the grid is sufficiently positive in respect to the cathode to permit conduction. Because the average voltage is dependent upon the above-mentioned biasing voltage waveform, the tube will conduct in the described cycling manner.

*Timing control*

Although the start-end spot, merging as described, in most cases eliminates and in all cases greatly minimizes distraction resulting from scaning the start-end spot, any residual discrepancy may be made acceptable and even pleasing by causing it to recur at a natural vibrato rate. In order to do this it is first necessary to cause the tone wheel blank to cycle at such a rate that proper timing will bring about a start-end spot of the type described at natural vibrato rate intervals. If the tone wheel blank cycles at the natural vibrato rate itself, it is necessary to place one start-end spot on each track. If the tone wheel blank cycles at one-half the natural vibrato rate, it is necessary to time the start-end spots in such manner that two appear approximately equally spaced in each cycle, etc.

Figure 12:
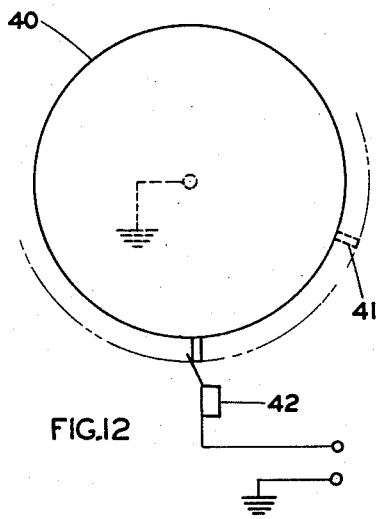
Fig. 12 is a semi-mechanical timing device.

One method of triggering the switch 31 in Fig. 9, to commence and terminate the timing cycle is that shown in Fig. 12. In this case a turntable 40 normally supporting the light sensitive blank has affixed to its periphery a trigger 41. Operatively positioned in such manner that it will be cyclically engaged by said trigger 41 is a switch 42. In many methods familiar to those skilled in the art, the periodic operation of this switch 42 once a cycle, can be utilized to effectively start the timing cycle and to end it. A "one-kick" multi-vibrator has successfully been used in a circuit arrangement of this type.

Figure 15:
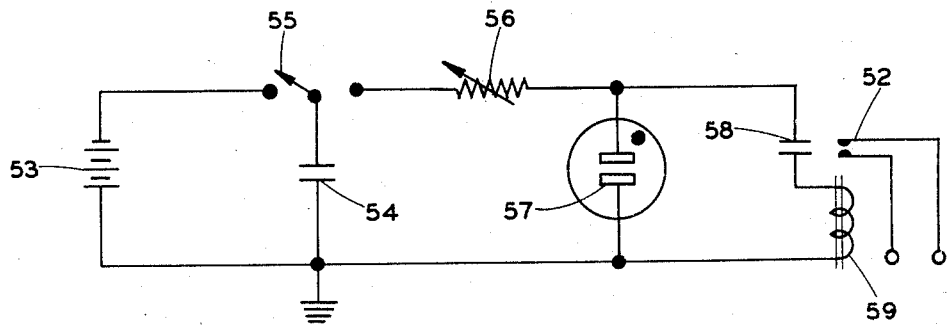
Fig. 15 is a simple electronic timing device.

A more desirable method of commencing and ending the exposure cycles would be one which is completely independent of the tone wheel disc position at any time. Such a device would enable random start-end spot location such as that shown in Fig. 1. In this figure, a tone wheel 43 has a plurality of soundtracks 44, 45, and 46 concentrically positioned about the center 47. Each soundtrack has a start-end spot shown as 48, 49, and 50. Because the disc is scanned by a slit 51 radial in nature it is seen that random positioning of the start-end spots will minimize the possibility of simultaneous scanning and resultant cumulative manifestation of their effects. If an electronic circuit is provided to trigger, maintain, and extinguish an exposure cycle, complete independence from tone wheel position is provided, and such random positioning can be obtained. If the switch 31, in Fig. 9, were replaced by the relay contacts 52, in Fig. 15, independent operation is assured. The circuit shown in Fig. 15 is a very simple electronic timing circuit intended to indicate principles rather than operative construction. Timing circuits providing the desired timing accuracy have been built in many forms.

In the circuit shown, a D.C. voltage source 53 is normally used to charge a relatively large capacitor 54 by means of a switch 55. When the capacitor 54 is completely charged the switch 55 is manually turned to the right to commence the cycling operation. The voltage across the capacitor 54 is impressed across the network consisting of a timing resistor 56, a gas discharge tube 57, another capacitor 58, and a relay 59. At the first instant of right hand contact of the switch 55 the capacitor 58 draws a charging current through the relay 59 closing the timing switch 52. Sufficient voltage drop appears across the resistance 56 to prevent ignition of the gaseous discharge device 57. As the capacitor 58 charges, the voltage drop across the timing resistance 56 decreases until a critical potential is reached where the gaseous discharge device 57 fires. The capacitor 58 immediately discharges through the low resistance of the discharge device 57 and the relay 59 becomes de-energized opening the timing switch 52. Simultaneously the heavy drain on capacitor 54 caused by the discharge current through the gas discharge device 57 removed most of the charge on capacitor 54. This condition prevents a recycling operation from occurring when the discharge device 57 extinguishes. The switch 55 is then manually returned to the left hand position to re-charge the capacitor 54 and to prepare for another operational cycle. The time during which the timing switch 52 is closed is dependent upon many parameters but can be made controllable by means of a variable resistance 56. Decreasing this resistance will result in shortening the time interval.

In operation the operator manually flicks the switch 55 which starts an exposure cycle. The cycle automatically ceases at a finite time dependent upon the setting of resistance 56. The operator then returns the switch 55 to its original position in preparation for another timing cycle. Because the timing cycles are independently and manually triggered the start-end spots will occur in random disposition on the tone wheel 43 in Fig. 1.

It is sometimes desirable to operate the tone wheel at a sub-multiple of a natural vibrato rate, as has been mentioned (my United States patent application, Serial No. 150,892, dated March 21, 1950, now Patent No. 2,818,761, issued Jan. 7, 1958). In this case a condition similar to that of Fig. 2 will be observed. In this figure a tone wheel 60 cycling at one-half the vibrato rate is seen to have two overlap spots 61 and 62 upon each soundtrack 63. The recording of these soundtracks 63 and 63' is essentially similar to that described above except that a double timing cycle is involved. A timing cycle can be considered starting at point 61 and progressing in a clockwise manner ceasing at point 62. An electronic timer similar to that described maintains an extinguished condition from point 62 clockwise to point 61, again extinguished from point 61 to 62, but igniting at point 62 on this second trip around and extinguishing at point 61. Recording, in this manner, results in two overlap spots because one-half of the total track is recorded during the first revolution, and the second track half is superimposed with overlaps at both ends during the second revolution. If the disc is cycled at one-half the vibrato rate the overlap spots will, of course, occur twice a revolution, or at the natural vibrato rate.

It is frequently desirable to add to the endless soundtracks a frequency vibrato during recording. This is to manifest itself as a periodic sharping and flatting of pitch recurrent at the vibrato rate. A simple method of introducing this condition is that shown in Fig. 13, where the tone wheel supporting spindle 64 is coupled to a constant speed drive shaft 65 by means of eccentric gears 66 and 67. These gears, while always remaining in mesh, introduce a sinusoidal variation in speed at the cycling rate. This effectively stretches the waveforms at the high speed point and compresses them at the low speed point during the recording process. As is well known, compression of a waveform along a time base is tantamount to raising its frequency, whereas, stretching is exactly the reverse. Subsequent scanning at a constant speed, therefore, will provide periodic pitch variation above and below a mean value, the desired condition.

Figure 14:
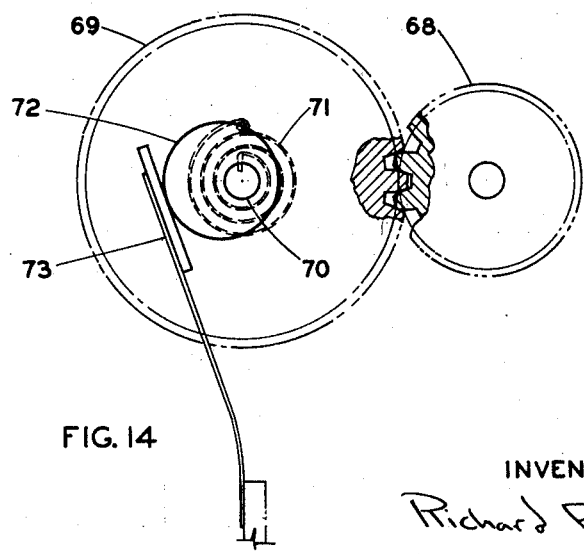

Another method of providing this speed change is that shown in Fig. 14. In this figure a driving gear 68 is meshed with a driven gear 69 resiliently connected to the tone wheel supporting spindle 70 by means of a spring 71. Affixed to the tone wheel supporting spindle 70 is an eccentric cam 72 upon which rides a braking device 73. Because the braking torque provided by the action of the brake 73 and the eccentric cam 72 varies periodically during each revolution of the tone wheel supporting spindle 70, the tone wheel blank will be decreased and increased in speed at that rate, the speed deviation being absorbed by the resilient spring coupling 71.

Figure 13:
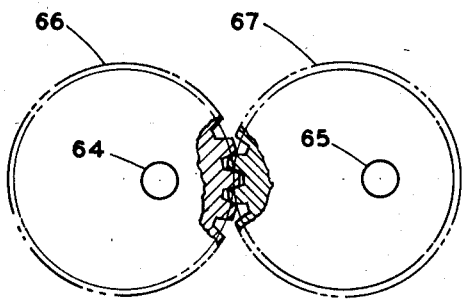
Figs. 13 and 14 are gear trains capable of producing a vibrato effect.

It will be noted that in the methods of Figs. 13 and 14, average speed of the tone supporting spindle is constant while its instantaneous speed periodically varies about this value. Such a condition provides very accurate pitch, assuming that the driving source is of very constant speed, such as a synchronous motor.

*Summarization*

Figure 3:
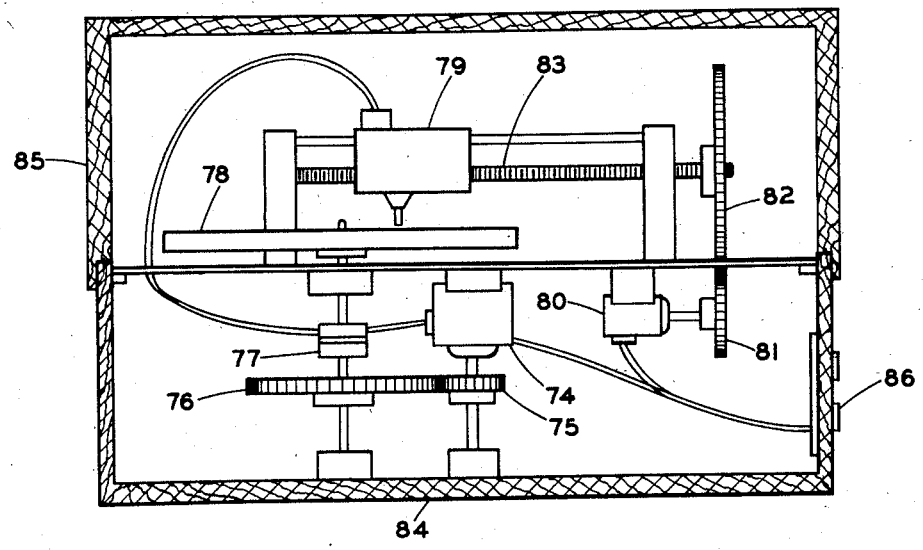
Fig. 3 is an assembly view of a typical tone wheel disc manufacturing machine.
Figure 6:
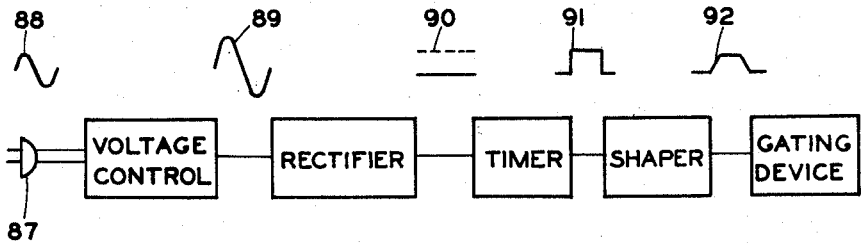
Fig. 6 is a block diagram with corresponding waveforms of an endless soundtrack timing, shaping, and amplitude controlling device.

An overall view of the entire series of operations required to obtain satisfactory results can be realized by referring to Figs. 3 and 6. In Fig. 3, a cross-sectional view of an entire tone wheel manufacturing machine is shown. A motor 74, preferably synchronous, is coupled through gears 75 and 76, and a resilient coupling 77 to a tone wheel supporting turntable 78. Adjustably mounted over this turntable is a light providing and modulating device 79. Its lateral position is controlled by means of a reversible motor 80 coupled through suitable gears 81 and 82 to a feed screw 83. The entire mechanism is enclosed in a light-proof case having a removable cover 85. A controlling panel 86 provides manually operative controls for positioning of the light modulating unit 79, for starting the turntable motor 74, and for connecting appropriate terminals. In operation, a light sensitive blank is placed upon the turntable 78 in a dark room, then the cover 85 is put into place. The turntable 78 is caused to revolve by means of a switch on the control panel 86, and the light modulating unit 79 is positioned for the first track. After an exposure cycle is completed the light modulating unit 79 is moved into position for the second track by means of a control on the panel 86. The process is repeated until all of the sountracks are recorded.

The exposure cycle is controlled by electronic means, the circuit of which is block-diagramed in Fig. 6. A plug 87 is connected to a suitable voltage source. This source supplies an alternating voltage as indicated by the waveform 88. A voltage control such as 26, in Fig. 9, is provided to change this voltage to the proper value for operation shown as 89, Fig. 6. This voltage is in turn rectified, producing a D.C. value 90. An electronic timer such as that shown in Fig. 15, chops this D.C. voltage 90 in Fig. 6, to a pulse of definite duration 91. Normally the pulse 91 will last for a single revolution of the tone wheel or a sub-multiple thereof. The pulse 91 is put through a shaping circuit such as that described in reference to Fig. 9, producing a sloping rise and fall to the waveform 92, Fig. 6. This waveform is used to operate a gating device such as those shown in Figs. 10 and 11. The gating device, in turn, is operatively connected to the light modulating device 79 shown in Fig. 3.

*Tone wheel processing*

Figure 1:
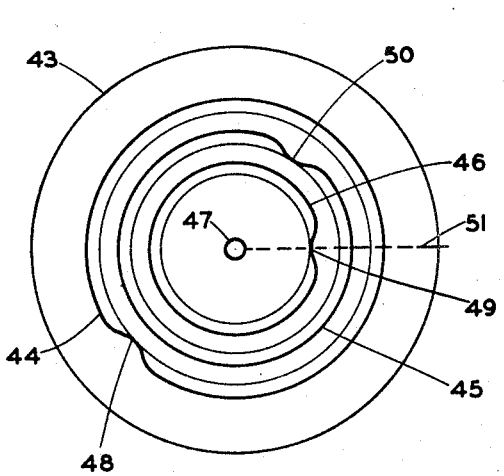
Fig. 1 is a front view of a tone wheel showing typical start-end spot locations.
Figure 2:
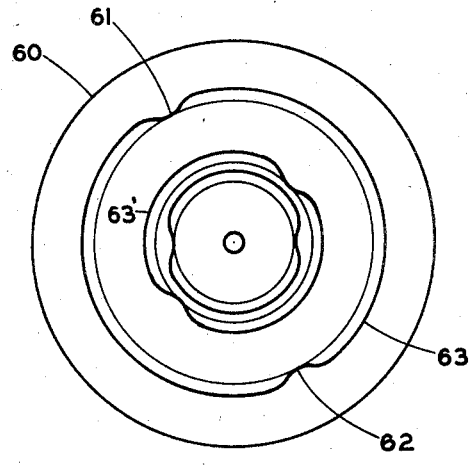
Fig. 2 is a front view of a tone wheel showing multiple start-end spot recording.

In the case of photographically manufactured tone wheels it is necessary in commercial practice to make a great number of reprints of the tone wheel masters which are created in one of the manners described. Because the tone wheel will normally take the shape as shown in Figs. 1 and 2, and may have many concentric tracks imprinted upon it, the problem of tone wheel concentricity is rather serious. It has been found that normal contact or optical printing does not render a satisfactory product if the center hole 47 in Fig. 1, is punched or drilled after the tone wheel is printed. My experience has indicated the need for central accuracy in the order of .001". In order to satisfactorily maintain this accuracy in production quantities it has been found necessary to perforate the printing stock either prior or during the printing process, and to use the perforations as a means for proper alignment of the sensitive printing stock and the optical device by which the master negative image is imposed upon the print.

Figure 18:
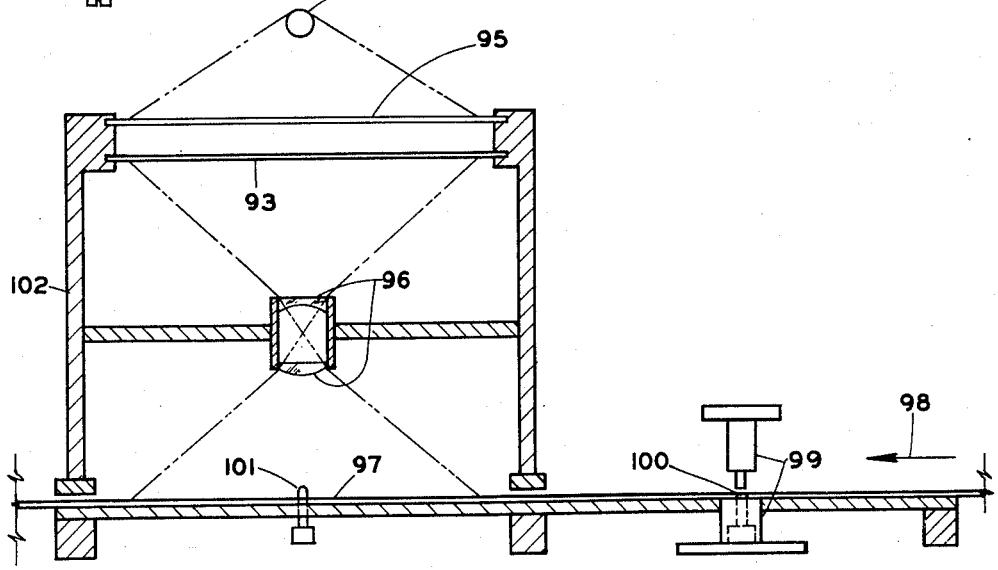
Fig. 18 is a typical tone wheel printing machine.

Referring to Fig. 18, the master negative 93, suitably illuminated by means of a light source 94, and a diffusing screen 95, casts an image by means of suitable condensing and objective lenses 96 upon the printing stock 97. As the printing stock 97 moves from its storage condition as shown by the arrow 98 it passes beneath a punch 99 which perforates the center hole 100. In the printing process the printing stock 97 is caused to move in controllable motions as indicated by the arrow 98 each section moved bringing the center hole perforation 100 over the alignment peg 101 in the printing machine 102. By operation in this manner perfect concentricity of the endless soundtrack waveforms 44, in Fig. 1, is insured.

A substantially similar method of alignment can be effectively used where contact printing is desired, the only major difference being in the elimination of the optical system shown in Fig. 18.

Figure 16:
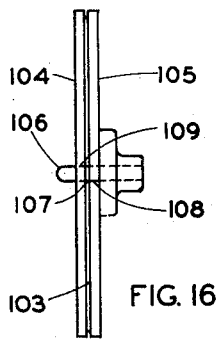
Fig. 16 is a cross sectional view of a typical photoelectric tone wheel disc.

The system of perforation described is also used to great advantage in stiffening the tone wheel print for subsequent use as a disc in playback apparatus. Referring to Fig. 16, the tone wheel print 103 is laminated between two pieces of transparent and suitably stiff material 104 and 105. A spindle 106 forming the means of support and rotation of the tone wheel projects through the perforation 107 in the tone wheel print 103. In the bonding process required to cause the tone wheel print 103 to satisfactorily adhere to the stiffening blanks 104 and 105 it is necessary to perforate the blanks 104 and 105 during or prior to the application of bonding means. The necessity for this sequence of operations is caused by the aforementioned concentricity requirements. It is very difficult and impractical to drill the holes 108 and 109 through the transparent blanks 104 and 105 after the center has already been dictated by the tone wheel print enclosed within.

The apparatus described herein may be varied to a considerable extent. However, for purposes of simplicity, details of a satisfactory design are given, it being understood that these details are not limitations on the invention but are given for convenience only.

The basic principles regarding soundtrack tapering, merging, centering, etc. may be applied to other types of soundtracks such as those of the electromagnetic variety, and those consisting of metallic projections on tone wheels. In each case essentially the same results may be obtained without deviating from the underlying principles, hereof.

Also, many of the phases of my invention may be applied to endless soundtracks on cylindrical bases, endless tapes, etc. The word "tonewheel" as used herein is intended to encompass all bodies upon which is inscribed a soundtrack intended for subsequent use as a tone source. I, therefore, desire to include within the scope of the accompanying claims all such equivalent construction as may be usable to accomplish the same results in substantially the same way.

What is claimed is:

1. In a device for placing a plurality of endless soundtracks on a single tone wheel blank, soundtrack recording means and drive means for rotating said blank with respect thereto, said recording means comprising recording cycle control means independent of said drive means and said blank for randomly spacing start-end spots of said endless soundtracks, said control means comprising triggering means adapted to initiate a recording cycle by said recording means independently in respect to time for each soundtrack recording cycle and time-reacting means operably connected to said triggering means and adapted to automatically terminate each recording cycle after a lapse of a predetermined length of time, said predetermined length of time being in the order of one-seventh of a second.

2. In a device for placing a plurality of endless soundtracks on a single tone wheel blank, sound track recording means and drive means for rotating said blank with respect thereto, said recording means including recording time controlling means independent of said drive means and said blank for randomly spacing start-end spots of said endless soundtracks, said controlling means comprising triggering means independent in respect to time for each soundtrack recording cycle, said triggering means comprising a manual trigger adapted to initiate a recording operation of said recording means and an electronic time-reacting device operated by said trigger and adapted to discontinue operation of said recording means after lapse of a predetermined length of time, said predetermined length of time being in the order of one-seventh of a second.

3. In a device for recording an endless soundtrack on a tonewheel, means for recording said soundtrack in steps in segments in such manner that the start-end spot discrepancy is substantially duplicated at one or more points on said soundtrack, said means comprising recording means and a recording time controlling means connected thereto, said controlling means comprising a triggering circuit and an electronic time-reacting device triggered by said circuit and arranged to determine the recorded segment length in terms of time.

4. In an endless soundtrack recording device, the combination of a stationary recording means, and drive means adapted to cycle a sensitized tone wheel past said recording means at an average speed equal to a natural vibrato rate divided by $n$, said drive means including automatic speed change means adapted to impart a speed variation component to said average speed recurrent at a natural vibrato rate, said recording means comprising recording cycle control means including recording modulation control means adapted to form $n$ start-end spots on said sound track and to gradually increase and diminish the effective modulation on said soundtrack at each start-end spot.

5. In a device for recording an endless soundtrack on a soundtrack blank, recording means and drive means for cycling said blank with respect thereto, and a recording time controlling means independent of said drive means and said blank, said controlling means being connected to said recording means and comprising a triggering circuit adapted to initiate a recording operation of said recording means and an electronic time-reacting device connected to said triggering circuit to be actuated thereby, said time-reacting device being adapted to discontinue operation of said recording means after a predetermined period of time, said period being in the order of one-seventh of a second.

6. In a photographic tone wheel manufacturing machine, soundtrack recording means, and turntable means adapted to rotate a photosensitive tone wheel blank past said recording means to record a circular soundtrack thereon, said recording means comprising an incandescent bulb as the source of light therefor and a power supply for said bulb, said power supply comprising a variable voltage direct current means and a control network connecting said bulb across said current means, said control network comprising variable condenser means in parallel with said bulb and a resistor and normally open relay switch means both in series with the parallel combination of said condenser means and said bulb, the ohmic values of said resistor and said bulb being substantially equal, and a recording cycle timer comprising a power supply condenser, a manually operable double throw switch device having alternately closable first and second switch means, a charging circuit for said supply condenser comprising said supply condenser and said first switch means and a discharging circuit for said supply condenser comprising a relay input network connected across said supply condenser through said second switch means, said input network comprising a timing condenser in series with the input means of said relay across a gaseous discharge tube and a variable resistor in series with the parallel combination of said tube and said timing condenser and said input means, and said turntable means comprising a substantially constant speed motor and a turntable and a drive means connecting said turntable to said motor, said drive means being adapted to impart a constant average speed at a vibrato rate in revolutions per second to said turntable and comprising a pair of eccentric meshed gears in the line of drive adapted to impart a periodic variation to the turntable speed recurrent at a natural vibrato rate, whereby actuation of said manually operable switch device initiates recording of a soundtrack of predetermined length in random relation to said blank and of gradually tapered start and end of generation.

7. In a machine for making an endless photographic sound track, photo-sensitive blank exposing means comprising an incandescent light and a light-modulating device therefor, drive means for cycling a photo-sensitive blank relative to said exposing means, and a power supply for said light, said power supply including an exposure interval control adapted to initiate energization of the filament of said light to commence an exposure interval and to automatically terminate said energization after an exposure interval of predetermined length to terminate exposure of said blank, the thermal lag characteristic of said filament relative to the effective cycling speed of the blank being chosen to provide graduated exposure characteristics at the beginning and end of said interval over substantial lengths of said soundtrack compared to the total length thereof.

8. Apparatus in accordance with claim 7, wherein said exposure interval control is adapted to terminate said energization after an exposure interval approximately equal to one circuit of said blank, and wherein said drive means is adapted to cycle said blank relative to said exposing means at a speed in the order of seven cycles per second.

References Cited in the file of this patent

UNITED STATES PATENTS

| | | |
|---|---|---|
| 1,734,675 | Hull | Nov. 5, 1929 |
| 1,836,206 | Townsend | Dec. 15, 1931 |
| 1,896,682 | Case | Feb. 7, 1933 |
| 1,967,239 | Hardy | July 24, 1934 |
| 2,065,172 | Crudo | Dec. 22, 1936 |
| 2,123,323 | Von Mihaly | July 12, 1938 |
| 2,160,252 | Meyer | May 30, 1939 |
| 2,196,348 | Von Mihaly | Apr. 9, 1940 |
| 2,250,140 | Shuemaker | July 22, 1941 |
| 2,373,560 | Hanert | Apr. 10, 1945 |
| 2,382,413 | Hanert | Aug. 14, 1945 |
| 2,484,881 | Fuschi | Oct. 18, 1949 |
| 2,513,109 | Roth | June 27, 1950 |
| 2,528,610 | Saffady | Nov. 7, 1950 |
| 2,588,680 | Williams | Mar. 11, 1952 |
| 2,746,334 | Williams | May 22, 1956 |